Sept. 10, 1935. W. M. MALISOFF 2,013,663
HYDROCARBON OIL REFINING
Filed Nov. 3, 1930
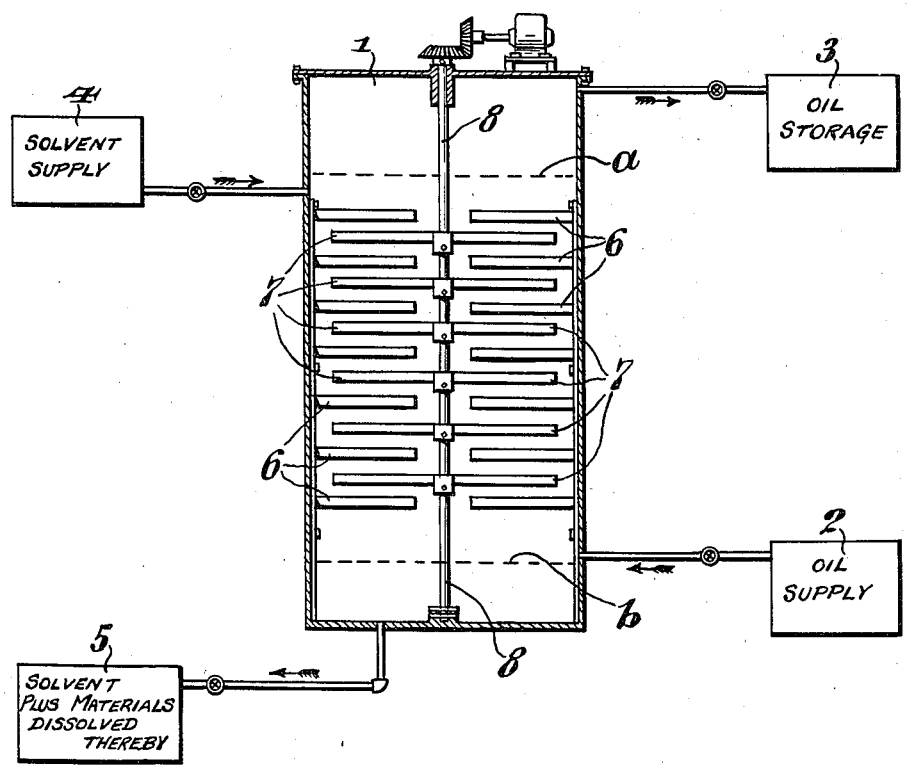

UNITED STATES PATENT OFFICE 2,013,663

HYDROCARBON OIL REFINING

William M. Malisoff, Philadelphia, Pa., assignor to The Atlantic Refining Company, Philadelphia, Pa., a corporation of Pennsylvania Application November 3, 1930, Serial No. 493,065

9 Claims. (Cl. 196—24)

The present invention relates to the refining of hydrocarbon oil, and more particularly to that aspect of hydrocarbon oil refining which deals with sulfur removal.

Certain of the low boiling hydrocarbon oils, as for example, petroleum distillates, such as naphtha, gasoline and lamp oil obtained from crude petroleum having a relatively high sulfur content and/or distillates obtained from cracking sulfur-containing oils, before being subjected to refining processes ordinarily contain sulfur in objectionable amounts. This objectionable sulfur may exist in the oil in a variety of forms of some of which the chemical composition is known and of some of which the composition is unknown. Various processes have been suggested for the removal of sulfur from hydrocarbon oil, but the problem of sulfur removal by an effective and economical process still remains one of major importance in chemical research.

My invention is particularly applicable to non-viscous hydrocarbon oils, by which I mean oils having kinematic viscosities not greater than 5 centipoises at 15.5° C. My invention is based upon the discovery that at least some of the objectionable sulfur compounds may be extracted from hydrocarbon oils containing them by contacting such oils with certain organic solvents which have a preferential solubility for sulfur compounds, which are immiscible or which may be rendered immiscible with the oil, and which are not of the same specific gravity as the oil. It is to be particularly noted that by my process sulfur removal is effected without chemical combination, interchange or reaction.

The solvents which I contemplate using are substances liquid at ordinary temperatures and come within the broad classification of polyhydric alcohols and their derivatives. Of the derivatives the ethers are of particular utility. Examples of such solvents are glycol, diethylene glycol, ethylene-glycol-monomethyl-ether, propylene glycol, diethylene glycol-monoethyl-ether, diethylene-glycol-monobutyl-ether, and similar derivatives and homologs. Glycerol and glycerol compounds corresponding to the above compounds also are of utility as solvents to be used in my process. For purposes of clarity, the terms "solvent" and/or "polyhydric alcohol derivatives" will be used interchangeably hereinafter and in certain of the appended claims, to indicate one or a mixture of two or more of the solvents above mentioned including polyhydric alcohols of which glycol and glycerol are examples.

My invention will be readily understood from the following more detailed description thereof, which however, is not to be considered as limiting the scope of the invention.

To the sulfur-containing oil is added an amount of the solvent which may be of the order of 20% of the volume of oil being treated. Intimate contact between the oil and solvent may be effected by subjecting the mixture to agitation. After effecting such contact the mixture is allowed to settle, whereupon due to immiscibility and the difference in specific gravity between the oil and the solvent, a two layer system is formed, the layers of which may be easily separated either by decanting off the top layer or drawing off the bottom layer. For such procedure may be substituted a step of centrifuging to effect the desired separation. After separation the solvent may be freed from dissolved sulfur compounds, as for example, by fractional distillation.

In carrying out my process by the batch method, repeated contacts with fresh portions of the solvent may be utilized. It is also to be noted that my process may be carried out to advantage in semi-continuous or continuous operation.

As an example of continuous operation of my process, reference is had to the accompanying drawing which shows diagrammatically, apparatus suitable for such operation. In describing this operation I have assumed that the solvent has a higher specific gravity than the oil. However, I do not contemplate limiting my invention in this respect, nor to the details of operation set forth by way of example. In the drawing, the treating tank 1 is equipped with stationary agitator blades 6, and rotating agitator blades 7 connected to a suitable shaft 8 driven by any conventional driving means. Above and below the portion of the tank 1 occupied by the agitator blades, are provided settling zones so that the oil may separate from the solvent, and vice versa. The oil to be treated is supplied from source 2 to the tank 1 at a point just below the lowermost of the agitator blades, the oil passing upwardly through the tank. The solvent is supplied to the tank from source 4 at a point just above the uppermost of the agitator blades, and thence passes downwardly through the tank countercurrent to the direction of flow of the oil. In passing through the portion of the tank occupied by the agitator blades, due to the intermixing caused by the blades, intimate contact is effected. The oil after separating from the solvent in the upper portion of the treating tank, for instance, in the portion above dotted line $a$, passes to suitable storage 3, while in the lower portion of the treating tank, for instance, in the portion below dotted line $b$, the solvent containing the sulfur compounds which have dissolved therein by preference, separates and is conducted to a suitable collecting chamber 5.

Semi-continuous operation may be effected in the apparatus shown in the drawing by first filling the chamber 1 with the solvent from source 4 to a level substantially that of dotted line $a$, then passing oil from source 2 continuously into and through the body of solvent in chamber 1, agitating during passage of the oil, and continuously withdrawing oil from the upper part of chamber 1 and passing it to suitable storage 3. This operation may be continued until the solvent becomes spent, whereupon passage of the oil and agitation are ceased, the oil and solvent are allowed to settle into layers and the respective layers separately withdrawn.

As before stated, immiscibility of the oil and solvent, or the ability to render the solvent immiscible with the oil is depended upon in my process. Certain of the solvents which I contemplate using, for example, glycol and glycerol, are substantially immiscible with the hydrocarbon oil, whereas other solvents such as ethylene-glycol-monomethyl-ether, and the inner ether of ethylene-glycol, sometimes called dioxan, are miscible with hydrocarbon oils. However, it is possible to use these oil miscible solvents in accordance with my process, since the solvents may be rendered immiscible with the oil by the presence of water, inorganic salts, such as calcium nitrate, or even organic compounds, for instance, urea. Herein, and in the appended claims, the term immiscible rendering substance will be used to denote one or more substances of the type indicated which are chemically inactive under the conditions of my process, which do not prevent the organic solvent from dissolving sulfur compounds from the oil, and which cause the organic solvent to become immiscible with the oil. It is preferable in many cases, for instance, in the operation of my process in a continuous manner, to employ a solvent which is initially immiscible with the oil. However, excellent results may be obtained, especially in batch operation, by mixing with the oil a solvent which is somewhat miscible therewith, whereby the solvent goes into solution with the oil and affords an excellent contact between the two liquids. Separation of the solvent from the oil may then be effected by the addition of an immiscible rendering substance to the solution of oil and solvent, causing the formation of a two-layer system from which the solvent may be easily separated as by decantation.

In general, I find that a small quantity of immiscible rendering substances is sufficient to render an initially miscible solvent immiscible with the oil. I have found that water may be added to the extent of substantially 10% by volume of the solvent without producing detrimental effects. In fact, the presence of a few percent of water is not detrimental, even where an oil immiscible solvent is used. A preferred amount of water or other immiscible rendering substance is the minimum amount thereof which will render the solvent substantially immiscible with the oil; this amount of course will vary according to such factors as temperature of treatment, the particular oil being treated, and the solvent employed.

I find, in general, that the temperature at which my process is carried out has some effect. Lower temperatures seem to increase the selective effect of the solvent upon the sulfur compounds in the oil. However, I do not contemplate limiting my process as to temperature.

I do not profess that my process is operable to remove the total sulfur content of an oil. The sulfur removed from an oil by my process may be considerably less than the total sulfur content of the oil. Nevertheless, my process is of distinct advantage in that among the sulfur compounds which are removed thereby, there is removed at least a portion of those sulfur compounds which resist practically every known process for the removal of sulfur from hydrocarbon oils.

The following specific examples will further aid in an understanding of my invention.

*Example 1*

A distillate resulting from cracking gas oil, having a sulfur content of 0.27% and a kinematic viscosity of 0.7 centipoises at 15.5° C. was treated for sulfur removal by adding thereto a quantity of glycerol amounting to approximately 20% of the volume of the oil. The mixture was vigorously agitated without addition of heat, for a short period of time, after which the mixture was allowed to settle, and the upper layer of oil was decanted off. The sulfur content of the treated oil was found to be 0.19%, which amounted to a sulfur reduction of substantially 30%.

*Example 2*

A distillate obtained by pyrolysis of gas oil from a West Texas crude oil and having a sulfur content of 0.29 was mixed with 25% by volume of diethylene glycol, and the mixture thoroughly agitated to effect intimate contact between the two liquids. Upon settling the mixture separated into a lower layer of diethylene glycol and an upper oil layer. After decantation from the diethylene glycol, the oil was found to contain 0.21% sulfur.

*Example 3*

An additional portion of the distillate treated in Example 2 was agitated with 25% by volume of diethylene glycol monoethyl ether containing 10% water. Upon settling the liquids formed a two-layer system from which the upper layer of distillate was removed by decanting. The sulfur content of the distillate after treatment was found to be 0.23%.

Wherever herein or in the appended claims, polyhydric alcohols, or derivatives, or homologs thereof are referred to, it is to be understood that the materials comprehended by such terms are compounds which have the polyhydric molecular structure. The polyhydric structure is maintained within the meaning of the term as used herein, if the alcoholic hydroxyl groups are present or are replaced by other negative radicals, but not when replaced by positive radicals. For example, where an alcoholic hydroxyl group of a polyhydric alcohol is replaced by a chlorine atom, a nitro radical, a sulfate radical or a negative hydrocarbon radical, the compound formed will continue to function as a polyhydric compound, and is therefore to be considered as a derivative, or a homolog of a polyhydric alcohol.

What I claim is:

1. The process for treating a sulfur-containing hydrocarbon oil to effect removal of sulfur therefrom, which comprises adding to the sulfur-containing oil an ether of a polyhydric alcohol, intimately contacting the oil therewith, thereafter separating and removing said ether from the oil.

2. The process for treating a sulfur-containing hydrocarbon oil to effect removal of sulfur therefrom, which comprises adding to the sulfur-containing oil an ether of a polyhydric alcohol and a sufficient quantity of an immiscible rendering substance to substantially inhibit miscibility between the ether and the oil, intimately contacting the oil therewith, thereafter separating and removing said ether and immiscible rendering substance from the oil.

3. The process for treating a sulfur-containing hydrocarbon oil to effect removal of sulfur therefrom, which comprises adding to and mixing with the sulfur-containing oil an ether of a polyhydric alcohol, adding to said mixture a sufficient quantity of an immiscible rendering substance to substantially inhibit miscibility between said ether and the oil, and separating and removing the ether and immiscible rendering substance from the oil.

4. The process for treating sulfur-containing hydrocarbon oil to effect removal of sulfur therefrom which comprises repeatedly adding to the sulfur-containing oil fresh portions of an ether of a polyhydric alcohol, after the addition of each portion thereof effecting intimate contact between the oil and said portion, prior to the addition of another portion and after the final portion has been added, and after intimate contact has been effected, separating and removing the respective portions from the oil.

5. The process for treating sulfur-containing hydrocarbon oil to effect removal of sulfur therefrom which comprises intimately contacting a body of the sulfur-containing oil traveling in a continuous stream with a body of an ether of a polyhydric alcohol traveling in a continuous stream countercurrent to the direction of flow of the body of oil, continuously separating the stream of oil from the stream of ether, and continuously removing the former from contact with the latter.

6. The process for treating a non-viscous sulfur-containing hydrocarbon oil to effect removal therefrom of sulfur, which comprises adding to the oil at least one of the solvents from the group consisting of glycol, glycerol, propylene glycol, diethylene glycol, ethylene-glycol-monomethyl-ether, diethylene-glycol-monoethyl-ether, and diethylene-glycol-monobutyl-ether, intimately contacting the oil therewith, and thereafter separating and removing the solvent from the oil.

7. The process for treating a non-viscous sulfur-containing hydrocarbon oil to effect removal therefrom of sulfur, which comprises adding to the oil at least one of the solvents from the group consisting of glycol, glycerol, propylene glycol, diethylene glycol, ethylene-glycol-monomethyl-ether, diethylene-glycol-monoethyl-ether, diethylene-glycol-monobutyl-ether, and an amount of an immiscible rendering substance sufficient substantially to prevent miscibility between the solvent and the oil, intimately contacting the oil therewith, and thereafter separating and removing the solvent and immiscible rendering substance from the oil.

8. The process for treating a non-viscous sulfur-containing hydrocarbon oil to effect removal therefrom of sulfur, which comprises adding to the oil at least one of the solvents from the group consisting of glycol, glycerol, propylene glycol, diethylene glycol, ethylene-glycol-monomethyl ether, diethylene-glycol-monoethyl-ether, and diethylene-glycol-monobutyl-ether, intimately contacting the oil therewith, adding water to the mixture of solvent and oil, whereby the water forms a solution with the solvent to render the same immiscible with the oil, settling to separate the solution from the oil, and removing the oil from contact with the solution.

9. The process for treating a non-viscous sulfur-containing hydrocarbon oil to effect removal therefrom of sulfur, which comprises adding to the oil at least one of the solvents from the group consisting of the polyhydric alcohols and their ethers, intimately contacting the oil therewith, thereafter separating and removing the solvent from the oil.

WILLIAM M. MALISOFF.